United States Patent [19]

Vandenberg et al.

[11] 4,377,131
[45] Mar. 22, 1983

[54] STANCHION CONSTRUCTION

[76] Inventors: August Vandenberg, 17306 Roseton Ave.; Ben W. Vandenberg, 17226 Roseton Ave., both of Artesia, Calif. 90701; Andrew W. Vandenberg, 15751 Ryon St.; Ben E. Haws, 8828 Laurel St., both of Bellflower, Calif. 90706

[21] Appl. No.: 263,888

[22] Filed: May 15, 1981

[51] Int. Cl.³ .............................................. A01K 1/06
[52] U.S. Cl. ................................................. 119/148
[58] Field of Search ................ 119/147, 148, 149, 150

[56] References Cited

FOREIGN PATENT DOCUMENTS

| 2316736 | 10/1974 | Fed. Rep. of Germany | 119/147 |
| 2446026 | 4/1976 | Fed. Rep. of Germany | 119/148 |
| 2818513 | 11/1979 | Fed. Rep. of Germany | 119/147 |
| 2242929 | 4/1975 | France | 119/148 |
| 2332703 | 6/1977 | France | 119/148 |

*Primary Examiner*—Hugh R. Chamblee
*Attorney, Agent, or Firm*—Cislo, O'Reilly & Thomas

[57] ABSTRACT

In stanchion constructions of the type used in feeding lots and/or milking parlors, it is desirable to be able to control the cattle stations as by locking the cattle in captive positions or, alternatively, having the cattle stations remain open to permit free feeding and the like.

The herein disclosed invention employs simple mechanical expedients, not requiring expensive forming techniques and having simple structure such as an elongate bar or rod with simple abutments formed, if desired, by through bolts and nuts to cooperate with a simple latching member to provide the captive position at the cattle stations.

The elongate member is supported for linear and radial or rotational movement, so as to permit selective positioning of the pivotal members making up the cattle receiving stations in a simple, expedient manner, requiring little, if any, maintenance and construction sophistication.

13 Claims, 13 Drawing Figures

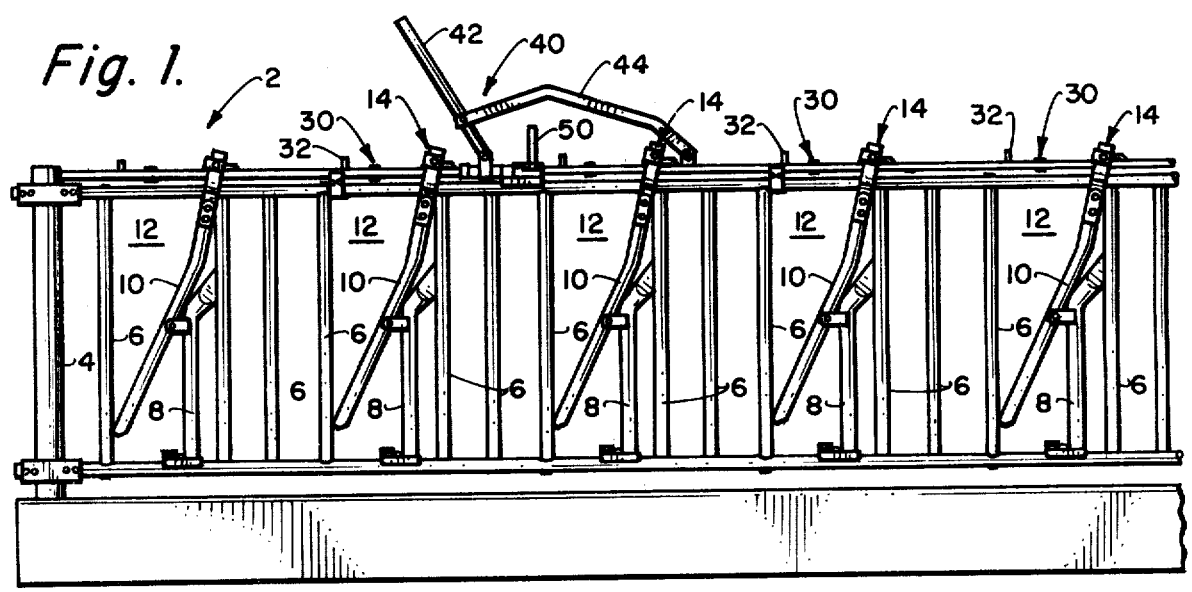
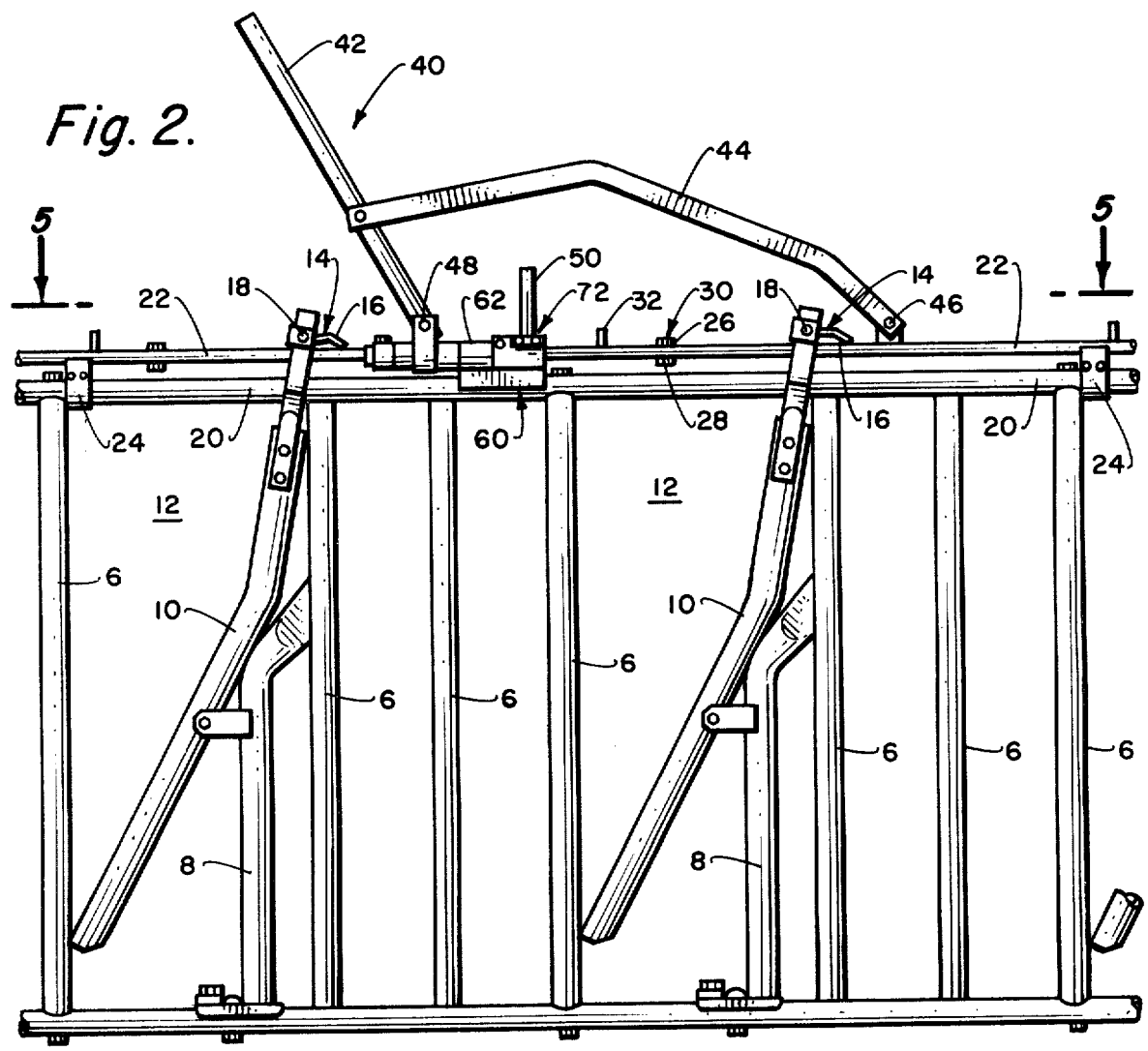

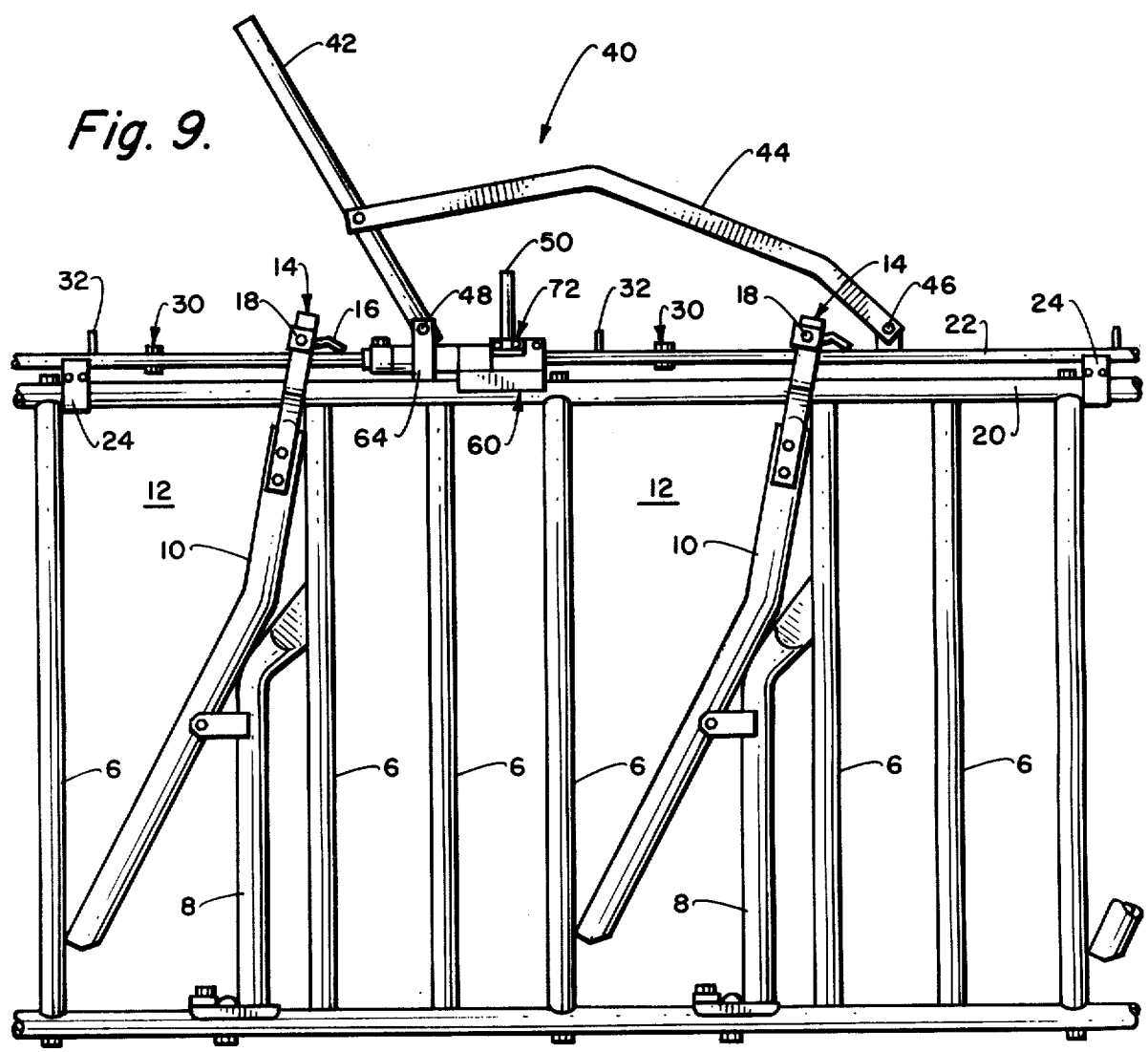
Fig. 9.
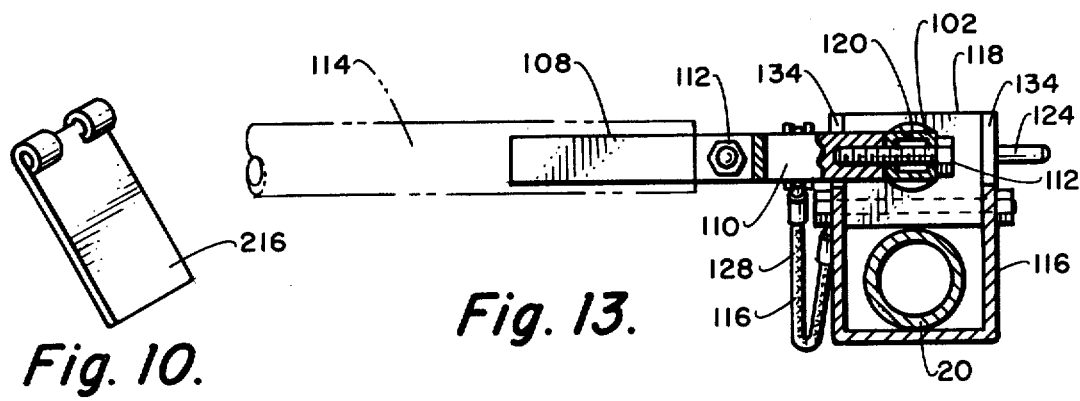
Fig. 10.
Fig. 13.

STANCHION CONSTRUCTION

BACKGROUND OF THE INVENTION

Multiple cattle stanchions are usually found in feed lot and milking station environments wherein it is desirable and necessary to either captively retain cows during a milking process where the stanchion is in a milking parlor or, alternatively, provide feed stations which are easily accessible to individual animals without creating a situation where there will be competition for feed allotment.

In stanchions of the foregoing type, it is highly desirable to be able to have the cattle lock themselves into the particular station where it is desired to perform a milking function or, alternatively, to have the station freely accessible so the animal may come and go at its pleasure for feeding and the like purposes.

In utilization of stanchions of this type, it becomes desirable to be able to have the animals locked into the captive position without the use of manual labor and, alternatively, to be able to position the pivotal swing pipe making up the cattle station, in conjunction with other structure, non-lockable for ease of access to the individual stations, and, further, to be able to unlock the pivotal swing members so as to allow exit of the individual animal from the cattle or animal receiving station.

The prior art, such as Albers U.S. Pat. Nos. 4,037,566, 4,051,813, Vandenberg 4,150,638 and Albers 4,185,592 have disclosed various cattle stanchion apparatuses wherein there are disclosed plurality of fixed and release stanchions located in side-by-side relationship wherein sophisticated and difficultly formed structure cooperate to form captive and non-captive cattle receiving stations. In these prior art structures, draw bars and the like are utilized having notches or slots to cooperate with a latching member of a specific configuration wherein considerable drag resistance is involved, not to mention the sophistication required in forming the structure, as well as maintaining it in operable condition.

With the herein disclosed invention, there is a stanchion structure which employs in one embodiment, a simple rod-like member having spaced abutments in simplified form, formed by through bolts and nuts at each cattle receiving station, to cooperate with a simple latching member mounted on a pivotal swing pipe member to thereby form the latched or captive position for each cattle receiving station. The elongate rod extends about the length of the stanchion structure and is radially movable or rotatable so as to be able to disengage the latch member from the abutment to thereby open, or make non-captive, the swing pipes at each of the cattle receiving stations.

A spaced pin or swing pipe engaging member is also positioned in radially spaced relationship to the rod and pivotal swing pipe member so as to be able to move same into the non-captive position or the cattle receiving position for each of the stations. An actuator member taking the form of a handle or the like, may be positioned on the rod so as to be able to linearly and radially move the rod member for one or more selective positions as will become apparent. The stanchion structure also employs a simplified positioning member which positions the elongate member in one or two positions for selected and desirable placement of the rod relative to the individual swing pipe members so as to have either captive or non-captive station positioning of the respective swing pipes located thereat.

Existing stanchion structures may be modified in keeping with the essence and spirit of the invention in a facile manner and, in some instances, would require replacement of a slide bar member with the elongate rod or bar member having the spaced abutment and pivotal swing pipe engaging members, as will become apparent, for cooperative association with existing latching members or, alternatively, replacement of those existing prior art latching members with the simplified latching members of the herein disclosed stanchion construction.

Obviously, the prior art attributes of being able to position the pivotal swing pipes from a singular location or position by means of a single actuator is maintained, as well as other attributes of these prior art structures, as those of ordinary skill in the art will at once recognize. However, the additional benefit to be obtained is, as earlier pointed out, the relatively low amount of maintenance and/or servicing necessary to maintain the equipment, the simplification of its structure and construction, and the ease of using same not requiring the maintenance or installation skill as found in prior art structures.

OBJECTS AND SUMMARY OF THE INVENTION

It is an object of the invention to provide improved stanchion construction.

It is another object of the invention to provide multiple stanchion construction having simplified structure for selectively and captively retaining animals at cattle receiving stations.

It is another object of the invention to provide self-locking stanchion structure wherein individual swing type bars or pipe members define individual cattle receiving stations which swing bars or pipe members are actuated by the animal into the closed and locked position, and wherein release thereof may be obtained from a remote location.

It is another important object of the invention to provide stanchion construction which is adaptable to existing stanchion structures so as to modify same to improve the action thereof and to have low cost, relatively maintenance-free service thereof.

It is another still, even more important, object of the invention to provide multiple stanchion construction employing an elongate rod-like member having simple abutment stops which cooperate with simplified latching members associated with individual swing pipe or bar members to form cattle receiving stations whereat the individual cattle may be captively retained.

It is another still, even further, more important object of the invention to provide an improvement for existing stanchion construction utilizing relatively low cost, easily maintained component parts wherein an elongate member extending about the length of the stanchion constructure, is linearly and rotationally or pivotally mounted with respect to said stanchion support structure.

It is another, even further more specific, object of the invention to provide an improved cattle stanchion structure employing a simple elongate rod or bar member, having abutment stops in its most simple form provided by through bolts and nuts and adapted to cooperate with a simplified latching member of a pivotal pipe or swing member to thereby form captive cattle receiving stations and wherein the elongate member is rotatable so as to disengage the latching member from the abutment.

It is another even further, more specific, object of the invention to provide a multiple stanchion construction employing a plurality of self-closing swing bars mounted from a support structure and having a simplified latching or locking member associated therewith for cooperative association with an elongate member running about the extent of the stanchion structure and having spaced abutments at defined cattle receiving stations and wherein the member is linearly and rotationally supported from said stanchion structure.

In an exemplary embodiment, the invention is directed to an improvement in cattle construction having support structure with spaced pivotal swing pipes, defining spaced cattle receiving stations, for accommodating cattle in selective captive and non-captive positions wherein the pivotal swing pipes are each provided with latching members for defining said positions wherein an elongate member is supported for linear movement from said support structure and extends about the length thereof and is provided with spaced latch member receiving means at each of said cattle receiving station for co-action with said latching members to define said captive positions. The elongate member is also radially rotatable relative to the support structure at least a distance to permit dis-engagement of said latching members with said latch receiving means. An actuator means to linearly and radially actuate and move the elongate member is also provided to complete the structure.

In another embodiment, a pin or swing pipe moving means is also positioned in spaced radial relationship to the elongate member so that movement thereof moves the individual swing pipes from the closed to the open position. Further refinement of the invention also includes an elongate member positioning means so as to retain the member in selective position to obtain one or more of the desired end results or function of the multiple cattle stanchion structure.

These and other objects of the invention will become more apparent from the hereinafter following commentary taken in conjunction with the figures of drawings:

BRIEF DESCRIPTION OF THE DRAWINGS

FIG. 1 is an elevational view of the stanchion structure of the invention illustrating the individual swing pipe in the open or cattle receiving position;

FIG. 2 is a view similar to FIG. 1, illustrating the individual swing pipes in the open position and the elongate member so positioned so as to be capable of cooperative co-action with the individual latching members so that the swing pipe members may be latched in the captive position;

FIG. 9 illustrates the stanchion structure of the invention wherein the individual swing pipe members are in the open position and the elongate member is so positioned that latching, locking or formation of the captive position is never attainable;

FIG. 10 is an enlarged view of the latching member of the stanchion structure of the invention;

FIG. 13 is a fragmented view taken along the line 13—13 of FIG. 11, showing still more details of this embodiment.

DESCRIPTION OF THE BEST EMBODIMENTS CONTEMPLATED

Figure 3:
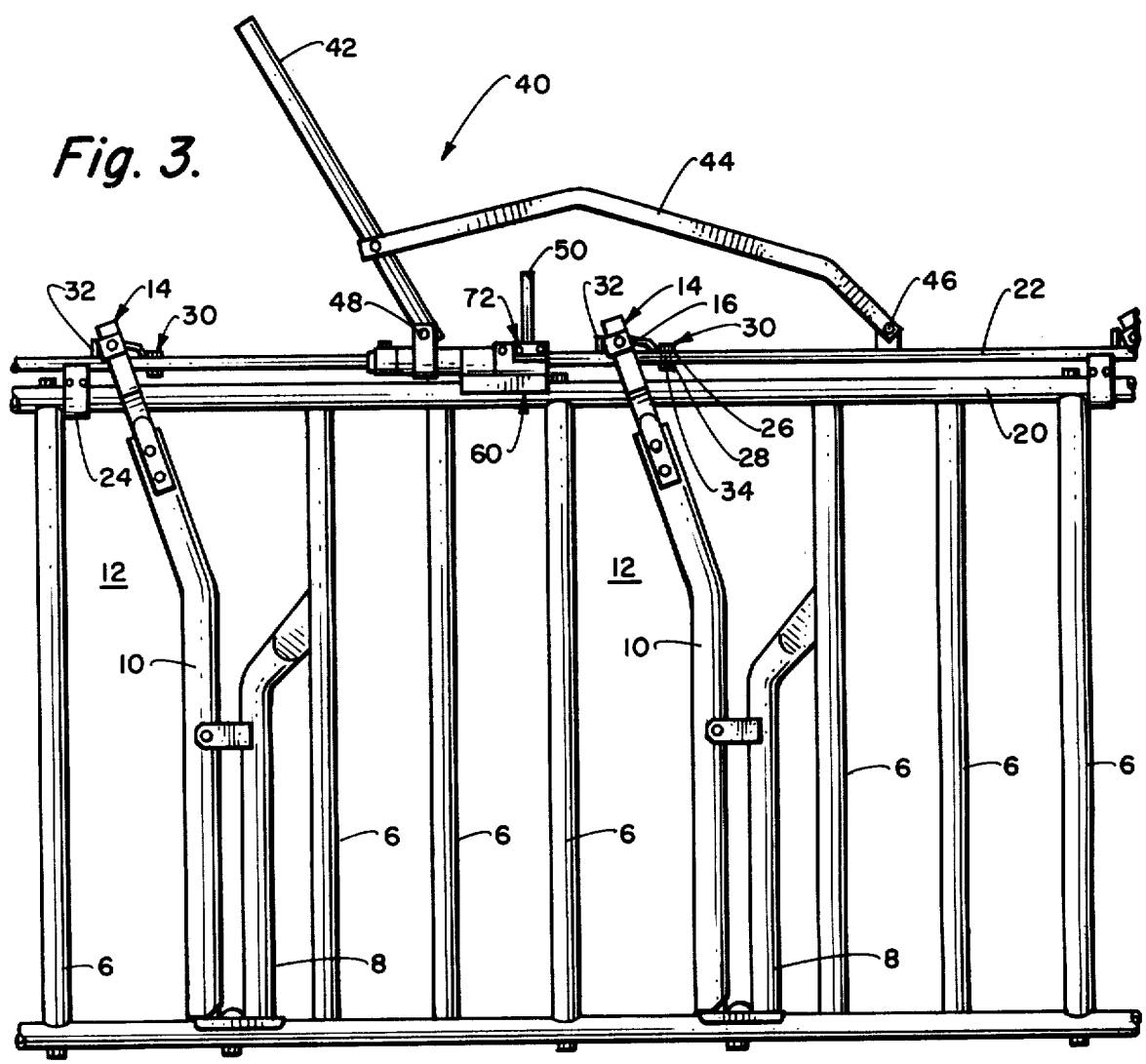
FIG. 3 is a view similar to FIG. 2, but illustrating the individual swing pipe members in the captive position and the elongate member so positioned so as to be in latching engagement with the latching member of the individual swing pipes.
Figure 5:
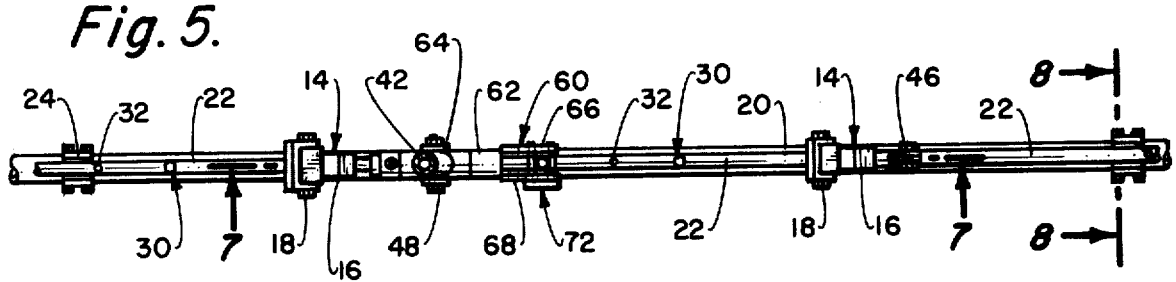
FIG. 5 is a view taken along the line 5—5 of FIG. 2.

Referring to the figures of drawing wherein like numbers of reference designate like elements throughout, it should be noted at the outset that only a portion of the individual stanchion structures of the invention will be described and illustrated. That is, while two or five swing pipe members are shown, it is to be understood that in actual practice the stanchion structures normally employed may comprise anywhere from five-thirty or more individual cattle receiving stations, depending upon end results required. Additionally, no inventive claim is laid to the support structure per se of the stanchion structure, the pivotal swing pipe members, the means of supporting same from the stanchion structure, and, indeed, the majority of the construction, with the exception of the hereinafter noted members, is similar or identical to the stanchion structure set forth in Vandenberg et al, Pending Patent Application on STANCHION CONSTRUCTION Ser. No. 079,070, filed Sept. 26, 1979, and the content of which is hereby incorporated by reference for the showing and illustration, as well as description of the basic stanchion structure not forming a part of the hereindisclosed invention, except as is readily apparent and as will be described.

Referring to FIGS. 1 and 2, it will be noted that the stanchion structure 2 comprises support structure formed by spaced, vertical pipes or members 4 and 6, having offset support pipe 8 from which individual reversely offset swing pipe members 10 may be supported to thereby define spaced cattle receiving stations 12, as is readily apparent.

Supported from the termini of swing pipes 10 are latching members 14 of slight curvilinear configuration, having depending portion 16 angularly situated, as seen, for engagement, as will be noted as the description proceeds. The latching member 14 is freely and pivotally supported on bolt or pin member 18 through an upper portion of each of the swing pipes 10.

Supported in linearly movable and rotational manner from the support structure and, more specifically, the upper rail 20, is elongate member 22 supported on bearing blocks 24, spaced in retained relationship on upper pipe or rail 20 to permit linear sliding movement of elongate member 22. The support block 24 obviously will have an interior or surface configuration congruent to the configuration of the elongate member 22 and, in this particular instance, the elongate member 22 is circular, angular-shaped or in the form of a pipe configuration.

Spaced along the extent of rod 22 are abutment means 30, in this particular instance taking the form of through bolts 28 and nuts 26 which are in secure relationship to form the abutting surfaces for co-action with the latching member 14 as will become apparent. The abutment surfaces or means 30 are spaced along the elongate member 22 so as to form the spaced intermediate means for co-action with each of the latch members 14 associated with each of the pivot pipes 10. That is, in the position shown in FIG. 2, the nuts or abutments 30 are such that upon movement of the swing pipe toward the left, as seen in FIG. 2, the latching member will latch with and become abutting to the abutment or nut 30 as best seen in FIG. 3. Thus, when the head of a cattle would enter the station 12, as seen in FIG. 2, downward movement of the head and neck thereof will cause swing pipe 10 to rotate to the left, as seen in FIG. 2, to assume the position in FIG. 3, by reason of the movement of swing pipe 10 the free pivotal upward movement of the latching member 14 over the immediately adjacent abutment 30, so as to achieve the captive position or latched position, as seen in FIG. 3.

Also in spaced position on the elongate member 22, are spaced pin members 32 which may be so positioned so as to define the furthest locking movement for the swing pipe members 10, as best seen in FIG. 3. The pin members 32 may not only be utilized to define the rotational extent of movement of individual swing pipes 10, but are primarily intended to provide the engaging means whereby the individual swing pipes 10 are moved from the closed or latched position shown in FIG. 3 to an open cattle receiving position as illustrated in FIG. 2. However, before describing the means whereby the specific structure is utilized to achieve this, it will be seen that rotational movement of rod or elongate member 22 will cause the surface of the elongate member 34 to be rotated to the upwardly disposed position adjacent to the terminus 16 of individual latching members 14 to thereby disengage the latching member from contact with the abutments 30.

Figure 4:
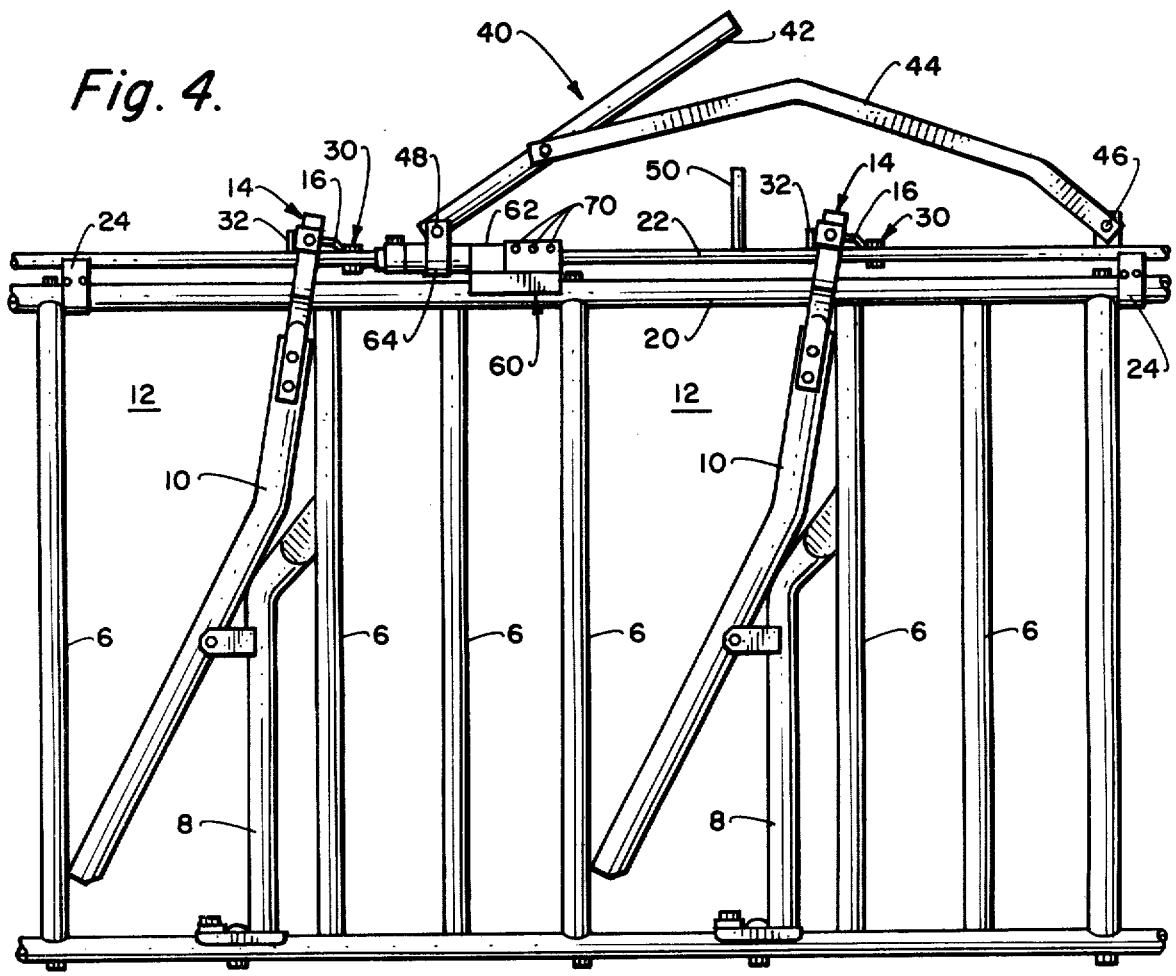
FIG. 4 is a view similar to FIG. 3, but illustrating the linear movement of the elongate member during the unlatching linear movement.

Referring to FIG. 2, it will be noted that the elongate member 22 has secured thereto an actuator 40 comprising a handle member 42 rigidly secured to the linkage arm 44, one end of which is rigidly secured via attachment 46 to elongate member 22 and the terminal end of the handle 42 being pivotally mounted as at 48, so as to linearly move the member 22 to the position shown in FIGS. 4 and 9.

Figure 6:
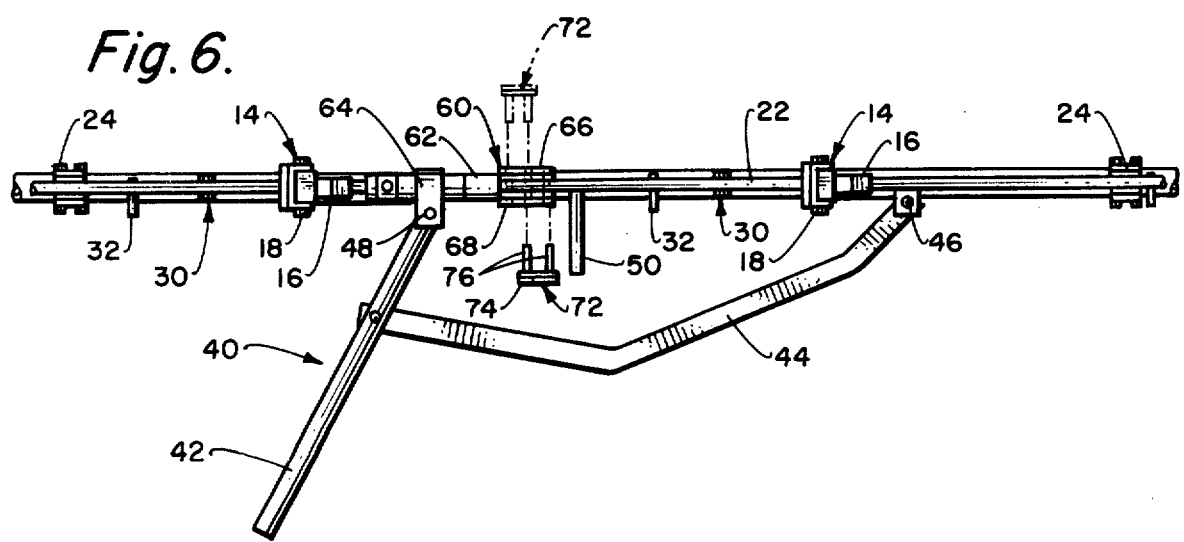
FIG. 6 is a top view of a portion of the stanchion structure of the invention illustrating the elongate member in the rotated or radially disposed position.
Figure 8:
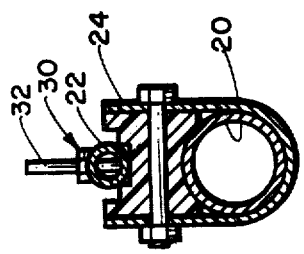
FIG. 8 is a view taken along the line 8—8 of FIG. 5 showing the support member for the elongate member.
Figure 7:
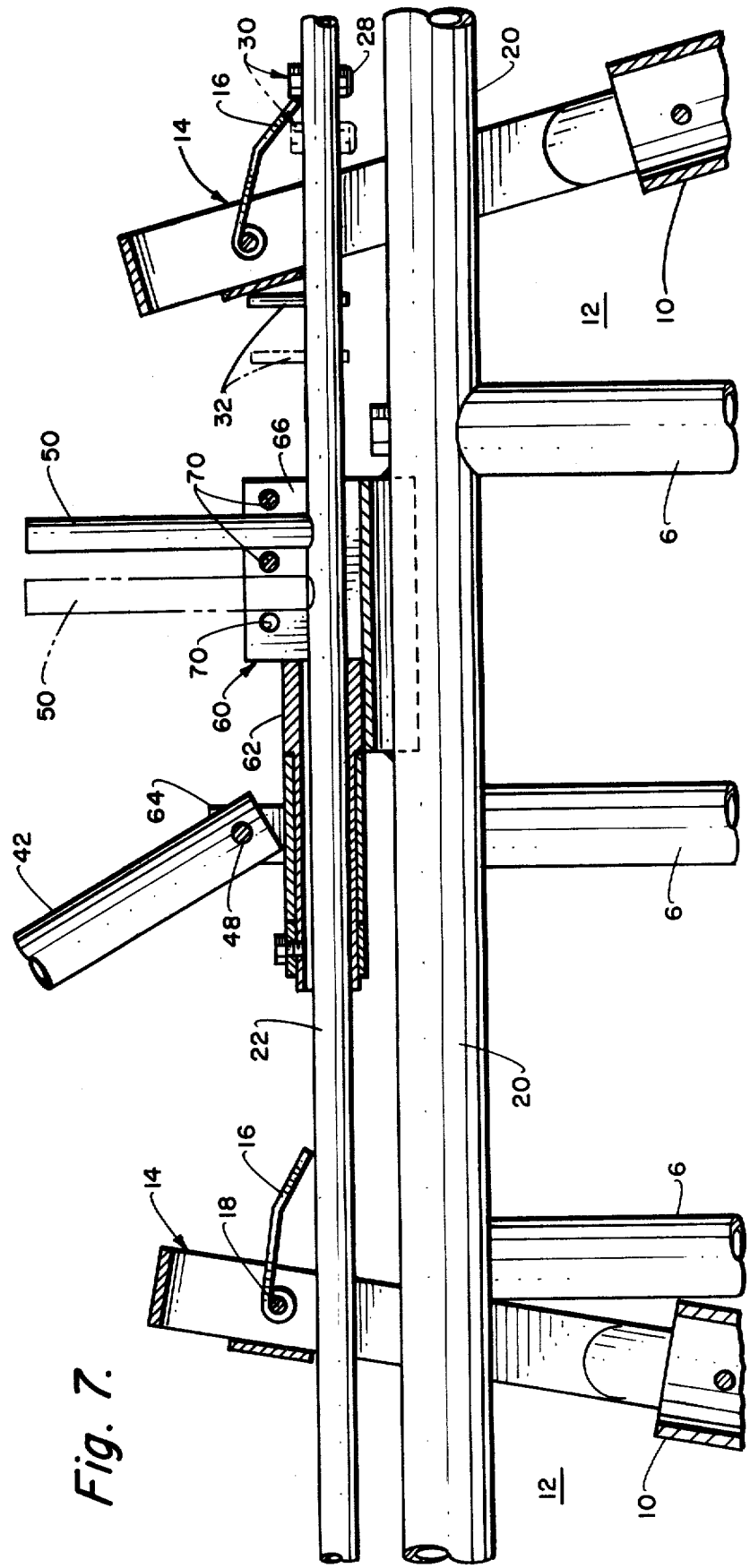
FIG. 7 is an enlarged fragmented illustration taken along the line 7—7 of FIG. 5 showing the actuator member for the elongate member of the invention in conjunction with the elongate member retaining means, the dotted line showing of the individual swing pipe and abutment members being shown in the always open position and the solid line illustrating the cooperativeness of the members for the latching or locking position.

In the FIG. 4 position, the actuator 40 has moved the elongate member 22 so that each of the individual swing bar moving members or pins 32 have pivoted the swing bars 10 into the open or cattle receiving position as shown in FIG. 4. Rotational movement of handle 42 through an arc segment of 90°, as seen in FIG. 6, will cause the individual latch members 14 to disengage, as previously described, to permit re-positioning of elongate member 22 into the position illustrated in FIG. 2 to receive cattle in self-locking relationship with regard to the individual swing pipes 10. Obviously, if the structure is left in the position shown in FIG. 4, cattle may not enter any of the stations 12. To assist in the rotational movement of the rod or elongate member 22, there is provided upright hand-held member 50 rigidly secured to member 22 so that both handle member 42 and upright 50 may be utilized to not only linearly move the member 22, but also rotationally move same as alluded to hereinbefore.

There is also provided a elongate member 22 positioning device 60 which is secured to the upper rail by rigid means, including weldments or the like, not shown, and wherein a barrel-like housing 62 encompasses a portion of the elongate member 22 to which is secured U-shaped bracket member 64 to pivotally mount the handle 42 by means of pivot 48, as previously described. Spaced apart plates 66 and 68, rigidly secured to the housing 62 are provided with aligned through bores or holes 70 adapted to receive two-pin retaining member 72, in this particular instance formed by a plate member 74, having spaced pins 76 to engage the through bore 70 so as to retain or position vertical upright 50 in one of a plurality of positions so as to determine the placement of the rod member 22 and, more specifically, the abutments 30 thereon for selective cooperation with the individual swing pipe members 10 and, more specifically, the latching members 14 associated therewith.

Thus, referring to FIG. 6, the placement of the rod or elongate member 22 and, more specifically, the vertical 50 within the space provided between each of the pins 76 of the member 72, will so position the member 22 that the abutments will be positioned for co-action with the individual latching members 14, so as to make the individual swing pipes 10 self-locking. This, then, would correspond to the placement of the assemblage and structure, as illustrated in FIG. 2. However, again referring to FIG. 6, placement of the vertical 50 and, hence, the extending member 22 in the position such that the vertical 50 is maintained between the pins 76, as shown in dotted line, this, then, would prevent self-locking or latching and the placement of the abutment means 30 would be such as to allow free feeding or free entry into the individual cattle stations 12 of the stanchion structure 2 and would more directly correspond to the always open position as illustrated in FIG. 9. That is, the placement of the rod member 22 is such that it is impossible for the individual swing pipes 10 to ever reach the position where the individual latch members 14 would be able to latch with the adjacent corresponding abutment 30. Hence, in the FIG. 9 showing, cattle may come and go at will and they would never be captively retained within the stations 12.

To describe the structure's operation, it should be apparent that the actuator 40 and, more specifically, the handle 42 thereof, is placed in the relative position illustrated in FIG. 2 to thereby position the rod or linear member 22 and, more specifically, the abutments 30 thereon, in such position that the cattle putting their head into the receiving stations 12 will cause the pivot pipe 10 to pivot and to permit abutting engagement or latching arrangement of the individual latch members 14 with the adjacently positioned abutment members 30 so that the cattle are in the self-locked position. Cattle may, of course, now be milked or otherwise acted upon.

If it is desired to have the swing bars 10 never latch, so as to captively retain the cattle in the stations 12, the actuator 40 and, more specifically, the handle 42, will be positioned as shown in FIG. 9 in cooperative association with the linear retaining member 72 so that the individual abutments 30 will never be positioned to be able to co-act with the individual latch members 14 pivotally supported from each of the termini of swing pipes or members 10.

After captive association of individual cattle with the structure as shown in FIG. 2, movement of the actuator 40 as shown in FIG. 4, will open or make the individual stations 12 non-captive to thereby permit removal of the individual cattle's head from the stations 12. Further, rotational movement of the member 22, as seen in FIG. 6, will allow the member 22 to be re-positioned into the posture shown in FIG. 2 so as to make the structure self-latching once again, but still not moving the individual swing pipe members 10 and, as set forth hereinabove, it will be remembered that to facilitate movement of the swing pipe members individual spaced pins 32 are secured to the exterior of the member 22 and are in the same longitudinal axis and plane as the abutments 30 so that upon rotation of the rod member 22, disengagement of both abutment surface and pin members may be achieved relative to the individual swing pipe members 10 and, more specifically, the latch members 14 associated therewith.

Figure 11:
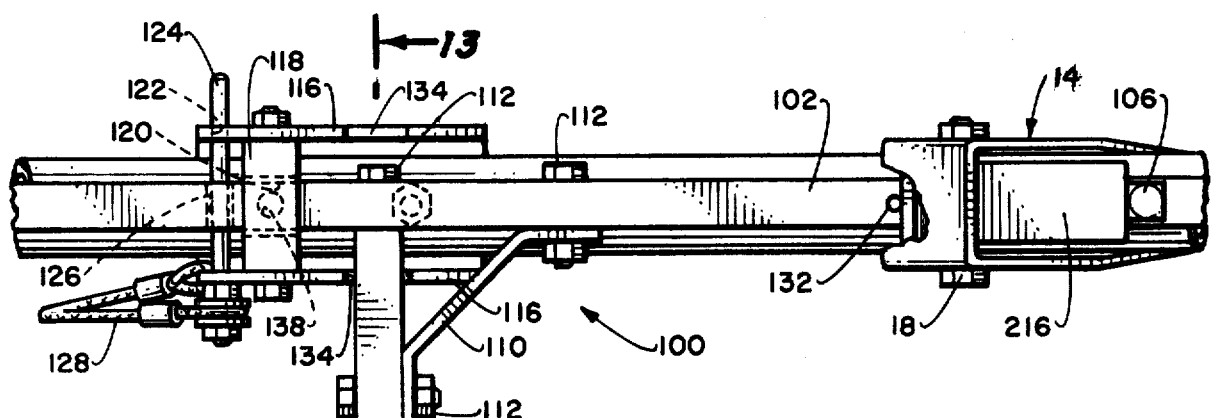
FIG. 11 is a partial plan view of another embodiment of the invention illustrating a rectangular tube elongate member with simplified actuator mechanism.
Figure 12:
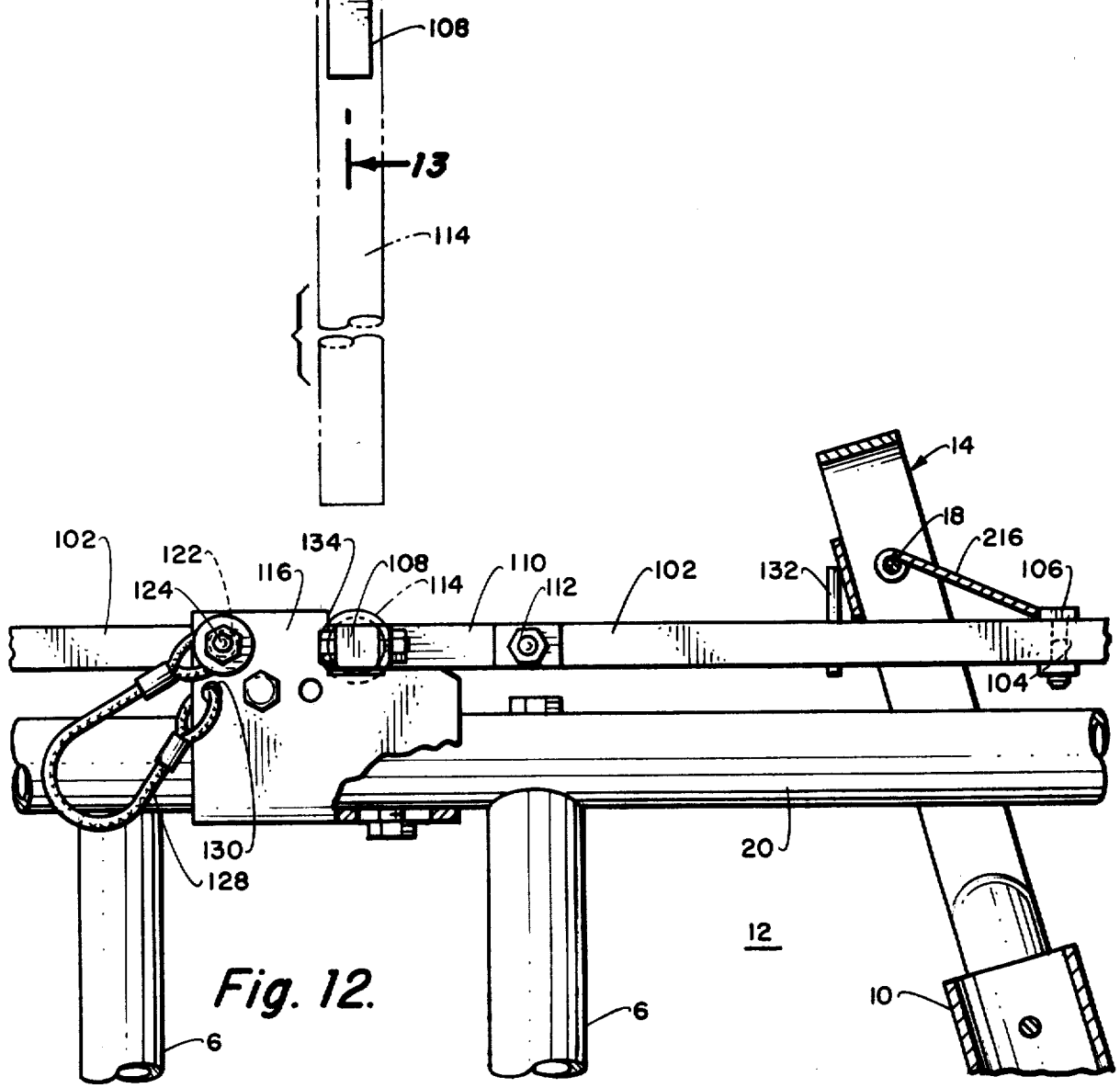
FIG. 12 is a partial, side, elevational view of the embodiment depicted in FIG. 11, but illustrating more detail of construction.

Referring now to FIGS. 11-13, inclusive, another embodiment of the invention 100 is illustrated wherein the elongate member takes the form of a rectangular tube or bar of hollow configuration, such that the elongate member 102 is more easily formed and worked upon so as to have formed therein apertures 104 to receive through bolts and nuts 106 for purposes previously described with regard to the rod or pipe embodiment of the invention depicted in the figures of drawings and hereinbefore commentary. Additionally, the elongate member 102 is more easily moveable in a linear and, for that matter, rotational manner, as previously described, because of its configuration. That is, because of the rectangular shape or formation, there is a point contact between the member 102 and the support blocks having the rectangular configuration, as for example, 24, as previously described and illustrated, but not shown in FIGS. 11-13, inclusive.

The structure 100 comprises a elongate member 102, of bar or rectangular configuration, having bar handle 108 secured to it through angle support iron 110 and being secured by means of nuts and bolts 112. The handle 108 is the means by which the elongate member 102 may be linearly or rotationally moved as in the prior described embodiment of the invention. If desired, and to facilitate more readily the movement of the elongate member 102, a hollow longer pipe, such as 114 shown in phantom line (FIGS. 11 and 13) may be utilized.

The elongate member 102 being supported from spaced support blocks is also retained in supported position relative to the stanchion construction by means of support bracket 116 having a "U" shaped in cross section configuration with rectangular support and abutment means 118 being provided with annular aperture 120 of a diameter equal to the diagonal of the elongate member 102 so as to permit, not only linear movement, but also rotational movement. However, so as to position the elongate member 102 in the retained position, the bracket 116 is provided with through bore 122 so that pin member 124 may be received in the aperture 126 of elongate member 102, such that linear or rotational movement of elongate member 102 is prohibited when the pin 124 is positioned, as illustrated in FIG. 11. Obviously, withdrawal of the pin 124, which is retained in captive relationship by means of lanyard 128 secured through aperture 130 of bracket 116, will permit free rotational and linear movement of elongate member 102.

Also positioned, as in the prior embodiment, are spaced pins 132 which cooperate with swing bars or pipes to facilitate movement thereof to the free-feeding or captive retaining positions as has been previously described.

The bracket member 116 is also provided aligned notches 134 so as to facilitate the radial movement of elongate member 102, and so as to accommodate the short handle 108 in either the position illustrated in FIGS. 11-13, inclusive, or alternatively, as rotated 90° (FIG. 13) into the opposite slot 134, if desired.

Referring to FIG. 12, it should be noted that the pin 124 has locked the elongate member 102 in the position for self-locking of the individual swing pipes members when the cattle enters the cattle receiving station; that is, the latch, as previously described, engages the spaced nut and bolt 106 to hold the swing pipe in the latched position. Removal of the pin 124 permits rotational movement of elongate member 102 and, consequently, the through bolt and nut 106, out of the engaging position, so that linear movement (toward the right, as seen in FIG. 12) will move the individual swing pipes into the open position. So as to maintain the elongate member 102 in the always non-locking position, i.e., where the nut and bolt complement 106 can not be engaged, the elongate member is provided with an additional through bore 138 which will accommodate and receive the pin member 124 so as to maintain elongate member 102 in the non-latching position. That is, when the elongate member 102 is rotated and moved (to the left, as seen in FIGS. 11 and 12) so that the aperture 138 is in alignment with the through holes 122 and bracket 116, the pin 124 may be received to thereby retain and hold the elongate member 102 in the non-locking position.

FIG. 10 and FIG. 12 shows an alternate latching member 14 of slight curvilinear configuration, having depending portion 216 angularly situated as seen, for engagements with spaced bolt and nuts 106.

With respect to the rectangular or bar shaped elongate member embodiment, it should be recognized that the essence of the invention is the same whether or not a hollow pipe or circular configured member be used as the elongate member, or, as has been shown, a rectangular tube-like or square member utilized for the configuration. In the particulars of operation, with the exception of those heretofore pointed out, each embodiment operates in the same manner, and as previously described.

While the invention has been described with regard to a specific embodiment, those of ordinary skill in the art will at once recognize that the invention may be applied to existing stanchion structures with little modification, except as in keeping with the dictates of the hereindisclosed invention and, further, those of ordinary skill in the art will recognize that a simplified mechanism has now been provided which is essentially maintenance-free in operation.

Additionally, while an individual rod, pipe-like or bar member has been shown for the elongate member 22, those of ordinary skill in the art will, of course, recognize that other specific shapes will be capable of performing in the manner intended by the invention.

All modifications and changes that will become apparent to those of ordinary skill in the art are intended to be covered by the appended claims.

I claim:

1. In cattle stanchion construction having support structure with spaced pivotal swing pipes defining spaced cattle receiving stations for accommodating cattle in selective captive and non-captive positions, said pivotal swing pipes having latching members for defining said positions, said latching members being pivotally supported from each of said swing pipes and having a depending terminus for a hereinafter defined latch member receiving means, the improvement which comprises:

an elongate, annular, pipe member supported for linear movement from said support structure and extending about the length thereof and having spaced latch member receiving means formed by spaced abutment surfaces on said elongate, annular, pipe member, said spaced abutment surfaces being formed by through bolts and nuts at each of said cattle receiving stations for co-action with said latching members to define said captive positions, said elongate member being radially rotatable relative to said support structure at least a distance to permit disengagement of said latching members with said latch receiving means; and actuator means to linearly and radially actuate said elongate member said actuator means comprising a handle member secured to said elongate, annular pipe member and having a retainer member thereon and being operatively supported to linearly move between a pair of parallel, spaced, plate members having aligned, spaced apentures to captively and releasably receive a pin member to retain said retainer member in a selected position within said parallel, spaced, plate members.

2. The structure in accordance with claim 1 wherein said elongate member is supported by spaced support members supported from the upper rail of said cattle stanchion construction.

3. The structure in accordance with claim 2 wherein said elongate member has point, as opposed to surface, contact with rail spaced support members.

4. The structure in accordance with claim 3 wherein said elongate member is rectangular-shaped in cross-section.

5. The structure in accordance with claim 4 wherein said elongate member is of tubular, metal construction.

6. Cattle stanchion construction comprising the combination:

spaced upper and lower horizontal support members; intermediate vertical support posts; a plurality of spaced and off-set support members having pivotal swing pipes defining spaced positions for accommodating cattle in spaced, self-actuating captive relationship, an elongate member extending the length of and operatively supported relative to said upper horizontal support member for linear and rotational movement and having a plurality of abutments in spaced relationship thereon; said off-set support member having a lower vertical portion and an upper off center inclined portion inclined at least a sufficient distance to permit pivotal movement of said pivotal swing pipe into a cattle receiving position; a latching member pivotally supported from the upper terminii of each of said pivotal swing pipes and being normally urged into engagement with said elongate member and being adapted to engage one of said plurality of abutments, said pivotal swing pipes and cooperating latching member being individually, selectively positionable in a locked and unlocked position, and actuator means for the linear and rotational movement of said elongate member to simultaneously move each of said pivotal swing bars, having its associated latching member in the engaged position with said adjacently positioned abutment of said elongate member and to disassociate said abutment from said latching member, an elongate member position defining member secured to said elongate member and an elongate member retainer disposed adjacent said actuator means and having a bracket-like configuration with aligned, spaced apentures adapted to receive a pin therein to position said elongate member position defining member to selectively linearly position said elongate member and actuator means in one of several positions.

7. Cattle stanchion construction comprising the combination of:

horizontal and vertical support structure; spaced, pivotally mounted members operatively supported from said support structure defining cattle receiving stations and each having latching members for retaining said spaced, pivotally mounted members in releasable, cattle captive stations, and operatively associated actuator mechanism for said spaced, pivotally mounted members for selectively positioning said spaced, pivotally mounted members in the latched, cattle captive position, said actuator mechanism including an elongate member extending about the length of said support structure and having spaced abutments on its upper surface and spaced pivotally mounted member engagements corresponding in number to said number of cattle receiving stations, said elongate member being linearly and rotationally positionable relative to said support structure, and wherein said actuator mechanism includes a positioning member for said elongate member in a selective one of several positions whereby said spaced abutments are selectively positioned relative to said pivotally mounted members for captive and non-captive positions corresponding to engagement and disengagement of said abutments with said latching members and an intermediate bracket member having spaced, aligned apentures having a pin member disposed in selected aligned apentures, said bracket member encompassing a portion of said elongate member adjacent said positioning member and cooperating to limit the linear travel distance of said elongate member and the operatively associated abutments by said positioning member engaging said pin member to thereby define different travel distances of said elongate member, whereby selective positioning of said elongate member is obtained.

8. Cattle stanchion construction comprising the combination of:

horizontal and vertical support structure; spaced, pivotally mounted, self-locking members operatively supported from said support structure defining cattle receiving stations and each having latching members for cooperative engagement with spaced abutments carried on a surface of an elongate member extending about the length of said structure, said elongate member having an actuator for relative linear and rotational movement thereof with respect to said support structure, said pivotally mounted, self-locking members being placed in the cattle captive position by entry of the cattle's head into said cattle receiving station; and a latching member supported at the termini of each pivotally mounted member and having a pivotally mounted tongue-like extending member for locking engagement with said abutments of said elongate member and being normally urged into engagement with said elongate member, said actuator being capable of opening a latched, pivotally mounted, self-locking member by linear and rotational movement of said elongate member and a retainer member secured to said elongate member and operatively supported to linearly move between a pair of parallel, spaced, plate members having aligned, spaced apentures to captively and releasably receive a pin member to retain said retainer member in a selected position within said parallel, spaced, plate members.

9. The structure in accordance with claim 8 including spaced pins on said elongate member disposed in the same plane as said abutments and being adapted to engage and move said self-locking members when said elongate member is linearly moved.

10. The structure in accordance with claim 9 wherein the end portion of said tongue-like member turns downward relative to said elongate member surface.

11. The structure in accordance with claim 10 wherein said elongate member is rectangular in cross-section.

12. The structure in accordance with claim 10 wherein said elongate member is circular in configuration and said abutments are formed by nuts secured to said elongate member by through bolts.

13. The structure in accordance with claim 12 wherein said elongate member is angularly movable through an arc of at least 90° to permit disengagement of said tongue-like member with an engaged abutment.

* * * * *